(12) United States Patent
Feinauer et al.

(10) Patent No.: US 8,202,206 B2
(45) Date of Patent: Jun. 19, 2012

(54) METHOD AND APPARATUS FOR MACHINING WORKPIECES

(75) Inventors: Achim Feinauer, Göppingen (DE); Karl Frommer, Schlierbach (DE)

(73) Assignee: Stama Maschinenfabrik GmbH, Schlierbach (DE)

( * ) Notice: Subject to any disclaimer, the term of this patent is extended or adjusted under 35 U.S.C. 154(b) by 1274 days.

(21) Appl. No.: 11/820,522

(22) Filed: Jun. 19, 2007

(65) Prior Publication Data

US 2007/0293379 A1 Dec. 20, 2007

(30) Foreign Application Priority Data

Jun. 19, 2006 (DE) .......................... 10 2006 028 970

(51) Int. Cl.
*B23Q 3/157* (2006.01)
(52) U.S. Cl. .................... 483/1; 483/5; 483/56; 483/57; 483/68; 700/179
(58) Field of Classification Search ............ 483/1, 4–13, 483/54–57, 68; 700/179
See application file for complete search history.

(56) References Cited

U.S. PATENT DOCUMENTS

| | | | |
|---|---|---|---|
| 4,631,465 A * | 12/1986 | Fukuyama et al. ............. 483/12 |
| 4,683,638 A | 8/1987 | Winkler et al. | |
| 4,780,952 A * | 11/1988 | Babel et al. ..................... 483/68 |
| 4,932,118 A | 6/1990 | Winkler et al. | |
| 5,383,832 A | 1/1995 | Blazek et al. | |
| 5,474,514 A | 12/1995 | Ruetschle et al. | |

FOREIGN PATENT DOCUMENTS

| | | |
|---|---|---|
| DE | 1 193 068 | 5/1970 |
| DE | 1 251 064 | 10/1971 |
| DE | 21 06 440 | 8/1972 |
| DE | 1 342 225 | 1/1974 |
| DE | 3521009 A1 | 12/1986 |
| DE | 3831869 A1 | 3/1990 |
| DE | 43 11 469 | 3/1994 |
| DE | 43 11 469 C1 | 3/1994 |
| DE | 4311469 | 3/1994 |
| DE | 4304361 A1 | 8/1994 |
| DE | 198 60 709 | 2/2001 |
| DE | 10236342 | 2/2004 |
| DE | 10344642 | 5/2005 |
| WO | WO2006050551 | 5/2006 |

OTHER PUBLICATIONS

European Search Report for EP 07 01 1589, stamped Oct. 2007.

* cited by examiner

*Primary Examiner* — Erica E Cadugan
(74) *Attorney, Agent, or Firm* — Klarquist Sparkman, LLP

(57) ABSTRACT

A workpiece is machined using a first cutting tool and subsequent cutting tools in a predefined time sequence. The sequence of cutting tools defines a sequence of previous and subsequent cutting tools, with each previous cutting tool being replaced by a subsequent cutting tool in the course of the machining operations. Each previous cutting tool, which is replaced by a subsequent cutting tool, is deposited at a defined storage place in a tool magazine. When being put back into the tool magazine, the previous cutting tools are distributed to the storage places in a spatial sequence which is different from a spatial sequence at the start of the machining operations and which substantially corresponds to the time sequence.

17 Claims, 6 Drawing Sheets

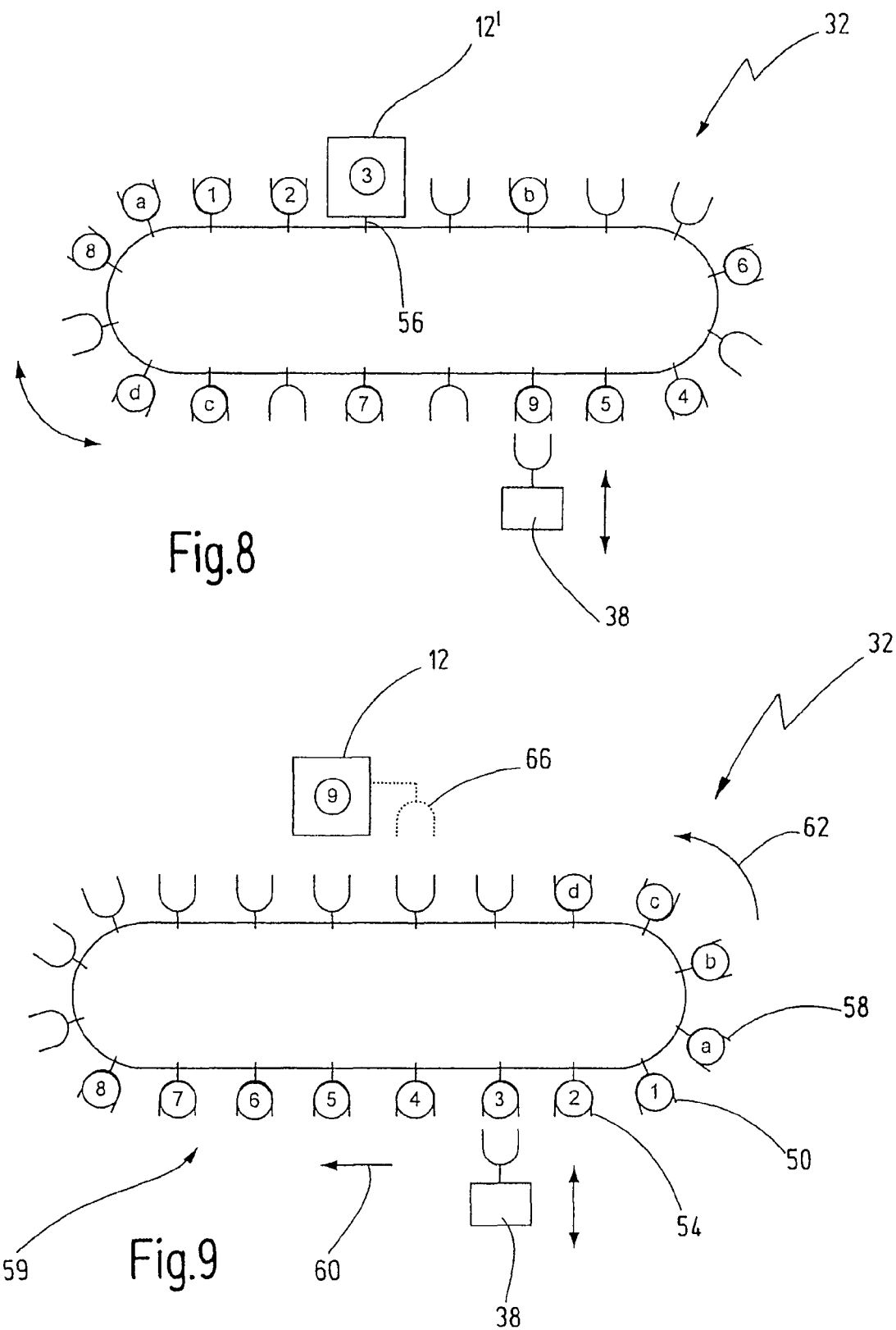

Embodiment Wherein the Second and Third Spatial Sequences are Interposed or Nested

FIG. 10

METHOD AND APPARATUS FOR MACHINING WORKPIECES

CROSS-REFERENCE TO RELATED APPLICATION

This application claims the benefit of German Patent Application No. DE 10 2006 028 970.6, filed Jun. 19, 2006, which is hereby incorporated by reference.

BACKGROUND

The present invention relates to a method and an apparatus for machining workpieces, in particular for metal cutting machining of metallic workpieces. More particularly, the invention relates to a method and an apparatus using a novel approach for efficiently distributing cutting tools to storage places of a tool magazine during machining operations.

German patent publication DE 43 11 469 C1, which is assigned to the present assignee, discloses a machine tool having a tool magazine which is designed as a chain magazine having a revolving chain. Storage places for the cutting tools are arranged on the chain. A cutting tool is picked up and deposited at a defined peripheral position of the chain. Arranged at another peripheral position is a gripper which is capable of removing a cutting tool from a storage place and depositing it in a storage place. During operation of the machine tool, in each case that storage place which lies directly adjacent to a storage place having the next tool in the sequence of the cutting tools is cleared by means of the gripper. In this way, the tool change can be carried out very rapidly, because the previous cutting tool is deposited directly next to the subsequent cutting tool.

The method and the apparatus from DE 43 11 469 C1 have proved successful in practice. They permit a rapid tool change and short chip-to-chip times, because the clearing of the adjacent storage place of the following tool is effected at the same time as the machining of the workpiece with the previous tool. In addition, the known apparatus is of simple and cost-effective construction, and it offers the user the possibility of loading the tool magazine "chaotically", i.e. the user need not match the loading of the tool magazine to the sequence during the machining of the workpiece.

However, it has been found in the practical application of this known method and apparatus that the cutting tools in the tool magazine have to be rearranged relatively frequently, which may lead to increased wear of the revolving chain and of the individual holders for the cutting tools.

BRIEF SUMMARY

Therefore embodiments of the present disclosure provide for a method and an apparatus for machining workpieces, which permit short chip-to-chip times with a simple and cost-effective design and with little wear.

According to a first aspect, there is provided a method for machining a workpiece comprising providing a machine tool having a tool receptacle for accommodating a cutting tool, providing a tool magazine having a plurality of storage places which are loaded with a plurality of cutting tools in a first spatial sequence, and machining the workpiece using cutting tools from the tool magazine in a predefined time sequence, wherein the predefined time sequence defines a series of previous and subsequent cutting tools, with each previous cutting tool being accommodated in the tool receptacle during a machining operation and being replaced by a subsequent cutting tool from the tool magazine for a subsequent operation in the course of the time sequence, and wherein the previous cutting tools, when being put back into the tool magazine, are distributed to the storage places in a second spatial sequence which is different from the first spatial sequence and substantially corresponds to the time sequence.

According to another aspect, there is provided an apparatus for machining a workpiece, comprising a tool receptacle for accommodating a cutting tool, a tool magazine having a plurality of storage places which can be loaded with a plurality of cutting tools in a first spatial sequence, and a controller designed for controlling machining operations at the workpiece with a predefined time sequence of cutting tools from the tool magazine, with the time sequence defining a series of previous and subsequent cutting tools, wherein, in the course of the time sequence, each previous cutting tool accommodated in the tool receptacle is replaced by a subsequent cutting tool from the tool magazine, and wherein the controller is designed for distributing the previous cutting tools to the storage places in a second spatial sequence when they are being put back into the tool magazine, with the second spatial sequence being different from the first spatial sequence and substantially corresponding to the time sequence.

According to yet another aspect, there is provided a method for metal cutting machining of a metallic workpiece, comprising providing a machine tool having a tool receptacle for accommodating a cutting tool, providing a tool magazine having a plurality of storage places which are loaded with a plurality of cutting tools in a first spatial sequence, and machining the workpiece using cutting tools in a predefined time sequence, with a previous cutting tool accommodated in the tool receptacle during machining in each case being replaced by a subsequent cutting tool from the tool magazine in the course of the time sequence, and the previous cutting tool being deposited at a defined storage place in the tool magazine, and with the previous cutting tools, when being put back into the tool magazine, being distributed to the storage places in a second spatial sequence, the second spatial sequence being different from the first spatial sequence and corresponding at least largely to the time sequence.

According to the novel method and apparatus, a previous, already used cutting tool is deposited at a storage place whose position within the spatial sequence of storage places corresponds at least largely to the position of the previous cutting tool within the time sequence of the cutting tools. This is effected independently of the spatial sequence in which the cutting tools are distributed to the storage places at the start or before the start of the machining operation. The present disclosure therefore enables a user to load the storage places of the tool magazine "chaotically," that is to say in any desired spatial sequence relative to one another. This is very easy for the user and is also advantageous if the machining program on the machine tool is changed because another workpiece, for example, is to be machined. Since the present invention offers the possibility of starting with a "chaotic" loading of the tool magazine, the new machining operation can follow the previous machining operation without the tool magazine having to be re-sorted beforehand. (Of course, it goes without saying that the requisite cutting tools for the new machining process have to be present in the tool magazine or have to be added. However, it is not necessary in the novel apparatus and the novel method to optimize the loading of the tool magazine before starting the new machining operation, even though this is of course possible as a complementary measure.)

When machining a workpiece for the first time in accordance with a new machining program, the novel method and the novel apparatus carry out automatic sorting of the cutting tools in the tool magazine due to the fact that a cutting tool (which was previously stored in any desired manner or "chaotically"), when being put back into the tool magazine, is deposited at a storage place which corresponds to the position of the cutting tool in the time sequence of the machining. In the case of the first cutting tool of a new program, the storage place may be freely selected in principle. However, it is preferred always to use a predefined first storage place for the first cutting tool.

Due to the new method and apparatus, the cutting tools, after the first cycle of a machining operation, lie in a spatial sequence in the tool magazine which corresponds to the time sequence of the cutting tools. The machine tool can therefore pick up the cutting tools very quickly from the tool magazine, at least starting from the second machining process, since the cutting tools are arranged in the magazine according to the requisite sequence. A tool change is thus possible with minimum traversed distances and can therefore be carried out quickly. In addition, the cutting tools scarcely need to be re-sorted after the first cycle of the machining process. The number of approaches to the storage places of the tool magazine and the number of chain feeds possibly required are reduced and consequently the wear is also reduced.

On the other hand, the novel apparatus and method still utilize the advantages which result from the basic concept described at the beginning. These are in particular a simple design and a cost-effective construction.

A further advantage of the novel apparatus and method is obtained if cutting tools are to be exchanged in the course of a prolonged production process, for example in order to ensure a uniformly high cutting quality. In the novel apparatus and the novel method, a replacement tool (sister tool) can be placed at any desired storage place in the tool magazine, since after its first use it is automatically sorted at the "correct" place in the sequence of the requisite cutting tools. In addition, re-sorting takes place automatically during a program change, such that the (second) spatial sequence of the cutting tools is optimally adapted again to the time sequence of the cutting tools at the latest after the first cycle of a new machining program. The above-mentioned object is therefore completely achieved.

For the sake of completeness, however, it may be pointed out here that it is not absolutely necessary within the scope of the present invention for the second spatial sequence of the cutting tools to correspond exactly to the time sequence of the cutting tools. For example, a cutting tool which is required very frequently in the sequence of the machining operation can be stored at a fixedly defined storage place (fixed place coding), which can thus be selected such that the required movements of the tool magazine are minimized. Such a "fixedly coded" cutting tool would therefore drop out of the sequence actually provided.

Furthermore, it may be the case that an "oversized" cutting tool, on account of its dimensions, can only be deposited at certain storage places within the tool magazine. In this case, too, the oversized cutting tool would drop out of the sequence actually provided. In view of this and other special cases, it is sufficient within the scope of the present invention if the second spatial sequence of the cutting tools corresponds at least approximately to the time sequence. However, the persons skilled in the art will recognize that the advantages of the invention become more clearly apparent the greater the conformity is between the second spatial sequence and the time sequence of the cutting tools.

In a refinement of the invention, machining of the workpiece starts with a first cutting tool, the first cutting tool being deposited at a predefined first storage place in the tool magazine after the machining, with every subsequent cutting tool being deposited at a predefined following storage place, and the predefined following storage spaces being joined to the first storage place in an ascending or descending order.

This refinement is a simple and cost-effective possibility in order to realize the inventive method in practice. Whereas, in the method and the apparatus from DE 43 11 469 C1 mentioned at the beginning, a storage place for a previous tool in each case is chosen as a function of the storage place of the following tool, the pre-previous cutting tool now in each case determines the storage place for the previous cutting tool in accordance to this refinement.

In a further refinement, the storage place for the previous cutting tool, if necessary, is cleared using an automated gripper, while the workpiece is being machined with the previous cutting tool.

In this refinement of the invention, the storage place required for depositing the currently used cutting tool is cleared simultaneously with the current machining operation, if necessary. As a result, delay times are also already minimized during the depositing of the first cutting tool.

In a further refinement, the spindle deposits the previous cutting tool directly at its storage place. Furthermore, it is preferred if the spindle also picks up the subsequent cutting tool directly from its storage place.

According to these two refinements, the tool change is effected by the "pick-up" method, i.e. the spindle reaches directly for the cutting tools in the tool magazine. Alternatively, the present invention may also be realized in other refinements with grippers which transfer the cutting tools between the tool magazine and the tool receptacle. In the last-mentioned case, it is advantageous if the corresponding gripper is also used to clear the storage place for the previous cutting tool.

The pick-up method is especially advantageous in connection with the present invention if a spindle serves as tool receptacle, since a spindle generally has very fast drives and can therefore very quickly reach the cutting tools sorted in the "correct" time sequence.

In another refinement, the spindle deposits the previous cutting tool directly at its storage place, while the subsequent cutting tool is removed from its storage place by a separate gripper. It is advantageous in this case if the separate gripper is coupled to the headstock, such that the insertion of the subsequent cutting tool into the spindle can be effected, while the spindle (together with the separate gripper) returns into the machining position. Especially short chip-to-chip times can be realized with this refinement.

In a further refinement, the machine tool has at least two working areas in which workpieces are machined, with a separate set of cutting tools being provided in the tool magazine for each working area.

This refinement is advantageous if the feeding and the removal of the workpiece is time-consuming, since a workpiece can already be machined in the one working area, while the other working area is loaded with a new workpiece. The provision of two separate sets of cutting tools permits short change times and thus a very efficient production for each machining operation.

In a further refinement, a first set of cutting tools, when being put back into the tool magazine, are distributed to the storage places in the second spatial sequence, and a second set of cutting tools, when being put back into the tool magazine, are distributed to the storage places in a third spatial sequence, the second and the third sequences occupying the storage places in opposite directions.

In this refinement, the two sets of cutting tools each are sorted in accordance with the present invention. In this case, occupancy of the storage places in opposite directions has the advantage that the existing storage places are distributed to the two tool sets with a low administrative effort.

This applies in particular if the second and the third sequence start at adjacent storage places, since the storage places are then filled in opposite directions from a "common" point and the tool sets do not "collide" with one another.

Alternatively, the second and the third spatial sequence of the cutting tools in another refinement are distributed to the storage places of the tool magazine in a manner nested one inside the other. This refinement reduces the feed movements in the tool magazine if work is carried out in an overlapping manner in the two (or more) working areas. The required magazine movements can therefore be reduced even further.

In a further refinement, the tool magazine is a chain magazine having a revolving chain, on which the storage places are arranged.

Chain magazines have proved successful in practice. They are especially suitable for realizing the present invention, because the storage places on the revolving chain can be occupied very simply in an ascending or descending order, even when two sets of cutting tools are to be deposited in the tool magazine in opposite directions.

It goes without saying that the above-mentioned features and the features still to be explained below can be used not only in the respectively specified combination but also in other combinations or on their own without departing from the scope of the present disclosure.

BRIEF DESCRIPTION OF THE DRAWINGS

Exemplary embodiments are shown in the drawings and are described in more detail below. In the drawings:

FIGS. 3-9 show the tool magazine from FIG. 2 with alternating occupancy of the storage places with cutting tools, as results from an embodiment of the present invention.

FIG. 10 schematically shows the embodiment wherein the second and third spatial sequences are interposed or nested.

DETAILED DESCRIPTION

Figure 1:
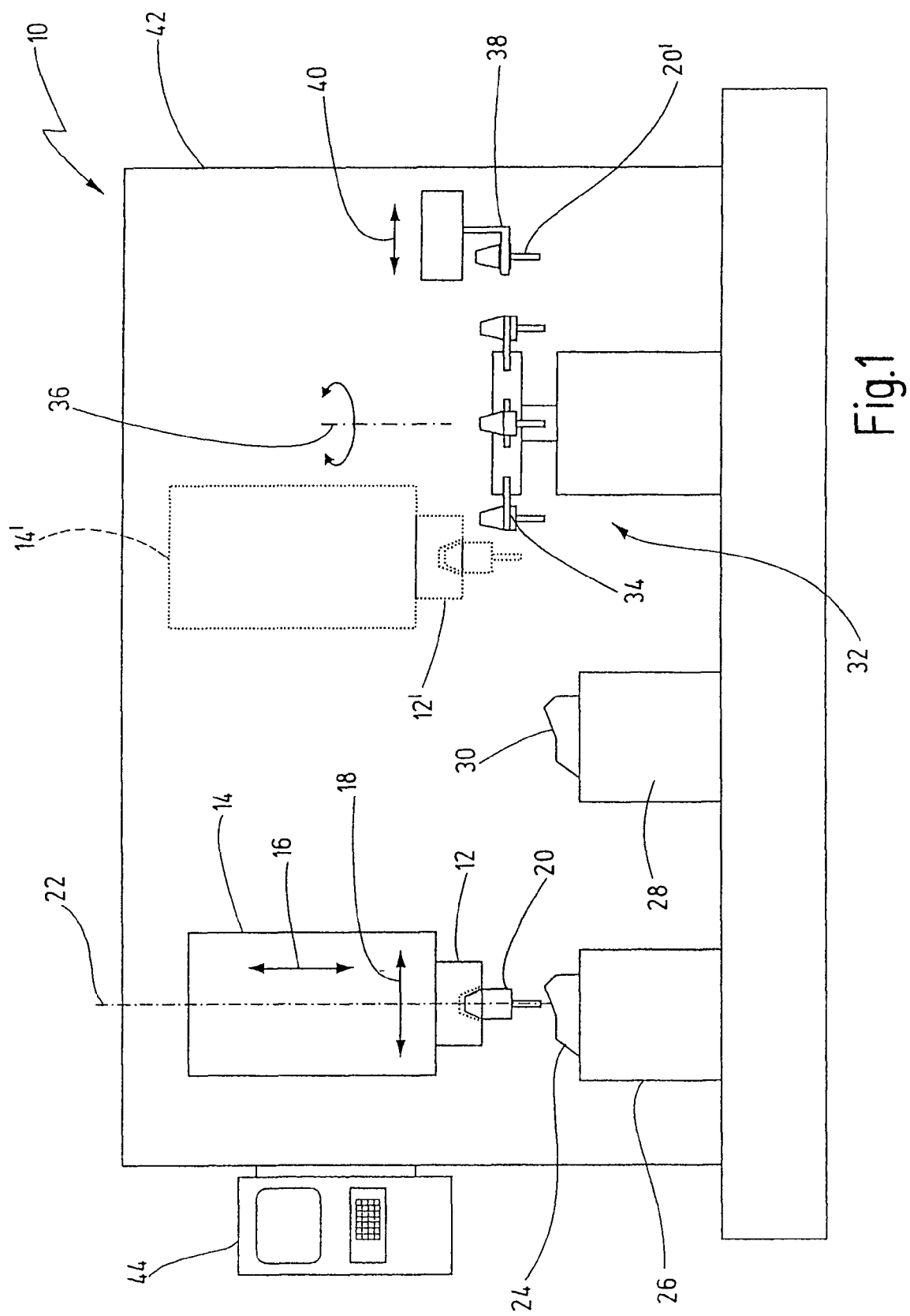
FIG. 1 shows a simplified illustration of a first exemplary embodiment of the novel apparatus.

An exemplary embodiment of the novel apparatus in its entirety is designated by reference numeral 10 in FIG. 1.

Here, the apparatus 10 is a machine tool for machining metallic workpieces. In particular the apparatus 10 is what is called a machining centre, which allows a plurality of different and fully automatic machining operations, such as milling, drilling, cut-off grinding, thread cutting, etc. The apparatus 10 has a spindle 12 which is arranged in a headstock 14. Here, the headstock 14 is moveable in a plurality of spatial directions, which is indicated by arrows 16, 18. In preferred embodiments of the invention, the headstock is arranged on a moving column which permits a movement in three directions which are at right angles to one another and are usually designated as X, Y and Z axis. However, the invention is not restricted to such moving-column machines and may also be used, for example, in machine tools in which the work spindle is at least partly fixed, whereas the workpiece is moved. Furthermore, the present invention may also be advantageously used in machine tools having horizontal work spindles and/or a plurality of work spindles.

Located at the free end of the spindle 12 is a tool receptacle in which a cutting tool 20 is clamped in place. As is usual in machine tools of this type, the cutting tool is clamped in place in the receptacle of the spindle 12 by means of what is called a tool holder. For the sake of simplicity, however, a distinction is not made in the present description between the actual cutting tool, e.g. a milling head or a thread cutter, and the tool holder. The term "cutting tool" covers both parts equally, provided the machine tool works with tool holders. In machine tools in which the cutting tools are clamped in place directly in the tool receptacle of the work spindle, only the cutting tool as such is of course meant.

The cutting tool 20 is rotated about the spindle axis 22 by means of the spindle 12 in order to machine the workpiece 24. Here, the workpiece 24 is clamped in place on a work table 26. Alternatively, the workpiece 24 could also be clamped in place in a work spindle in order to additionally permit turning operations in the same set-up. In addition, the present invention may in principle also be used in plain lathes.

Designated by reference numeral 28 here is a second work table on which a second workpiece 30 is clamped in place. The worktable 28 serves to machine the workpiece 30 while the workpiece 24 is removed from the work table 26, or the work table 26 is loaded with a new workpiece. Here, the work tables 26, 28 symbolize two working areas in which workpieces 24, 30 are alternately machined by means of the work spindle 12. In other embodiments, the present invention can also be used in machine tools having only one working area and/or in machine tools having a plurality of work spindles.

Reference numeral 32 designates a tool magazine which has a plurality of storage places 34 for accommodating cutting tools (shown here with tool holder). As can be seen from FIGS. 2 to 9, the tool magazine 32 is realized here as a chain magazine having a revolving chain. The storage places 34 can be moved about an axis 36 by means of the revolving chain, such that the individual storage places 34 can be alternatively brought into a suitable transfer position for a tool change.

Reference numeral 38 designates a gripper which is arranged at an outer peripheral position of the chain. Here, the gripper 38 is moveable in the direction of an arrow 40 and is thus able to remove a cutting tool 20' from a storage place 34 or insert into a storage place 34. In addition, a cutting tool 20' can be stored temporarily by means of the gripper 38 in order to carry out re-sorting within the tool magazine 32.

The tool change is effected here by the pick-up method, i.e. the spindle 12 can be traversed into a transfer position (reference numerals 12' and 14') at which the spindle 12 can pick up a cutting tool directly from a storage place 34 or deposit it at a storage space 34. Alternatively, the transfer of the cutting tools between the tool magazine 32 and the work spindle 12 can also be effected by means of a gripper (not shown in any more detail here). In particular, the apparatus 10 can be constructed in such a way that the gripper 38 serves to transfer the cutting tools between the tool magazine 32 and the spindle 12. However, from the current point of view, the arrangement shown in FIG. 1 having a gripper 38 arranged in an essentially fixed position (apart from the mobility in the direction of the arrow 40) and a tool change according to the pick-up method is preferred due to its simple and cost-effective construction.

Reference numeral 42 indicates an enclosure which encloses the working areas and the movable parts of the apparatus 10. The enclosure 42 may also consist of a plurality of parts and/or the tool magazine 32 may be arranged outside the enclosure 42 for the working areas and the spindle 12.

Reference numeral 44 designates a controller which controls the motion sequences of the apparatus 10 and the feeding of coolant, compressed air, etc. To this end, a machining program which is prepared by the user for a certain production process is loaded into a memory of the controller 44 in a known manner (not shown separately here). In an embodiment of the invention, the controller 44 is designed to carry out the depositing of the cutting tools in the tool magazine 32 according to the novel method.

In the description below of a preferred embodiment of the novel method, the same reference numerals designate the same elements as before. In addition, two sets of cutting tools are shown here, the cutting tools of a first set being numbered consecutively from 1 to 9, whereas the cutting tools of a second set are designated a to d. For example, the first tool set having the tools 1 to 9 serves to machine workpieces 24 in the first working area 26, whereas the tools a to d of the second set serve to machine workpieces 30 in the second working area 28.

Figure 2:
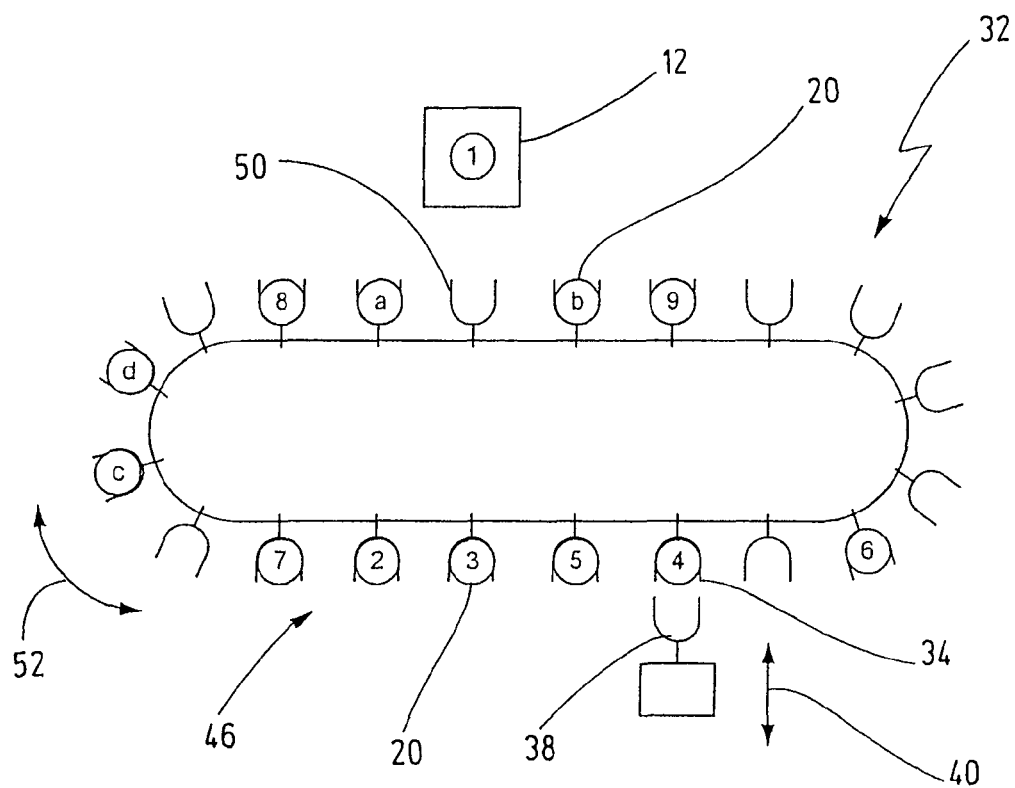
FIG. 2 shows a simplified illustration of the tool magazine of the apparatus from FIG. 1 with an initial loading with cutting tools.

FIG. 2 shows a situation at the start of a machining operation on a workpiece 24. The cutting tools 1 to 9 lie in a first spatial sequence 46 in the magazine 32, the first sequence 46 being very disorderly with regard to the distribution of the tools in the magazine. The first cutting tool 1 of the first set is already clamped in place in the work spindle 12. The workpiece 24 is machined with the cutting tool 1, which constitutes a first machining step in the time sequence of the machining steps.

As already mentioned, the cutting tools 1 to 9 are deposited in the tool magazine 32 in a largely unsorted manner, i.e. in a "chaotic" manner. However, it goes without saying that the controller 44 knows which cutting tool 20 is deposited at which storage place 34. This information is imparted to the controller 44 in a manner known per se during the loading of the tool magazine 32.

Figure 3:
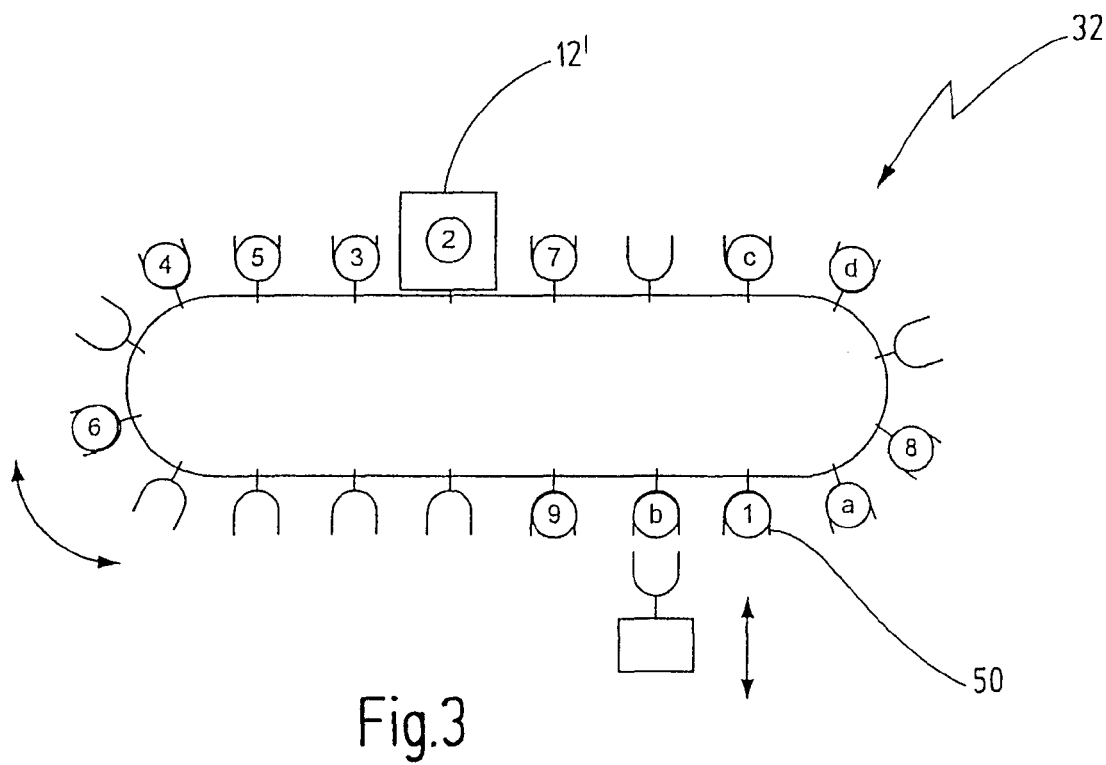

After completion of the machining operation with the cutting tool 1, the spindle 12 deposits the cutting tool 1 at a defined first storage place 50. The storage places of the chain magazine are then moved in the direction of the arrow 52 to such an extent that the spindle can pick up the second cutting tool 2 at the transfer position. This situation is shown in FIG. 3.

Figure 4:
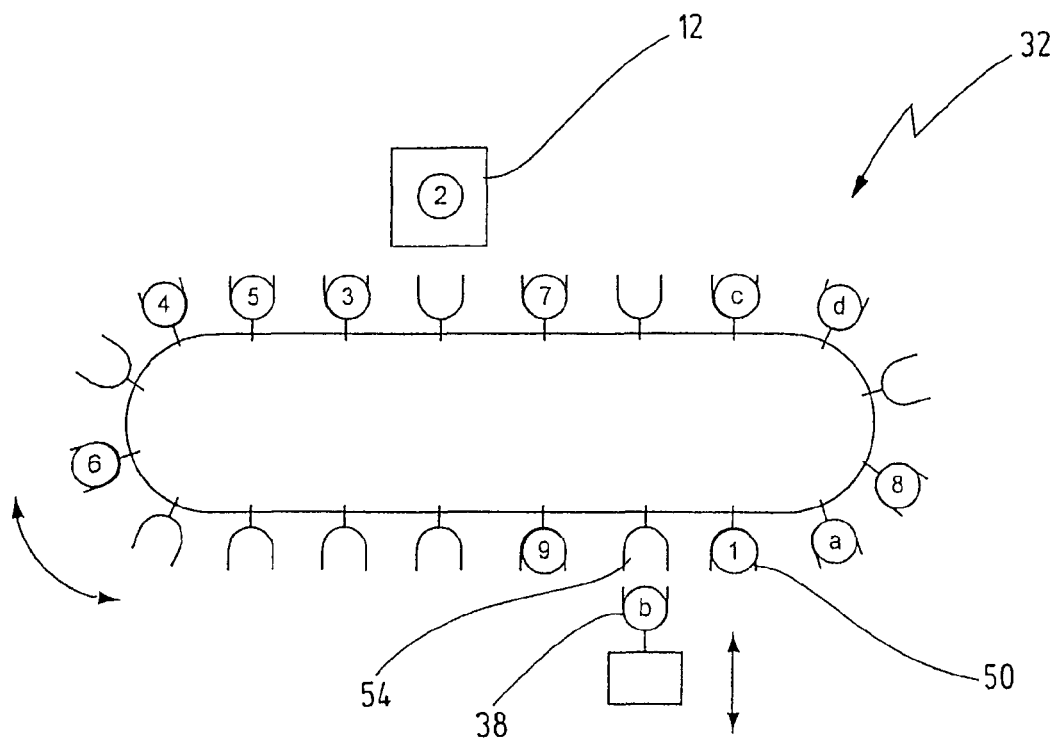
Figure 5:
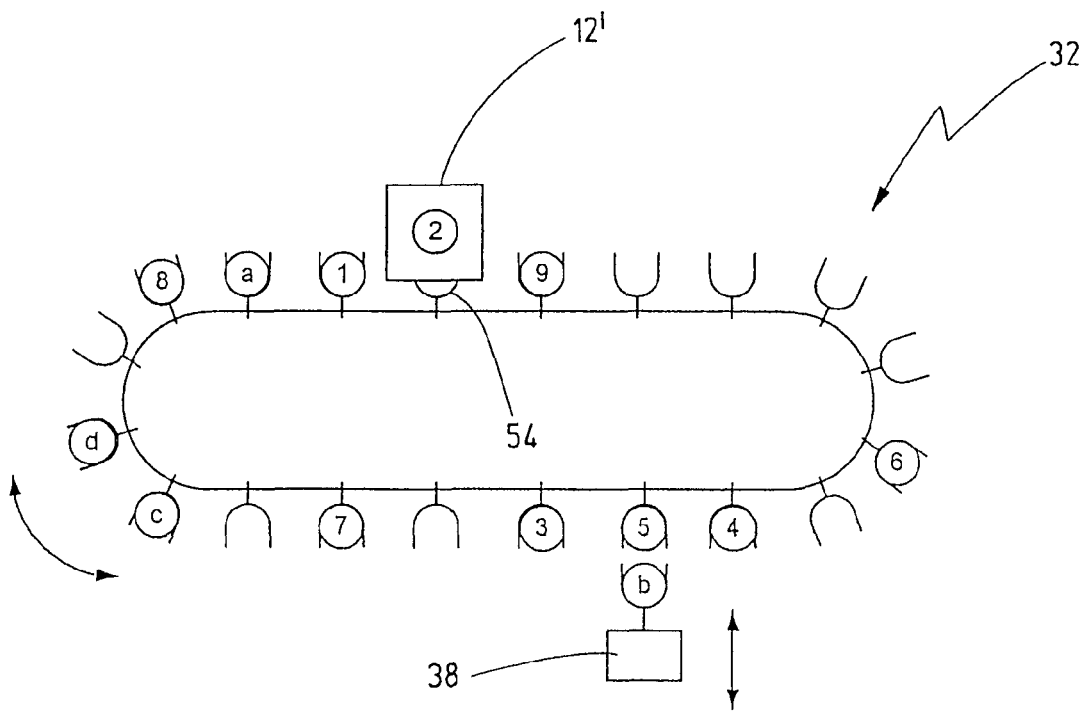

Once the spindle 12 has removed the cutting tool 2 and the machining operation on the workpiece 24 is continued (or simultaneously with this), a storage place 54 which is arranged next to the first storage place 50 is cleared by means of the gripper 38 (FIG. 4). The chain magazine 32 is then moved in such a way that the free storage place 54 comes to lie at the transfer position relative to the spindle 12. The cutting tool 2 is deposited at the storage place 54 after completion of the cutting operation (FIG. 5).

Figure 6:
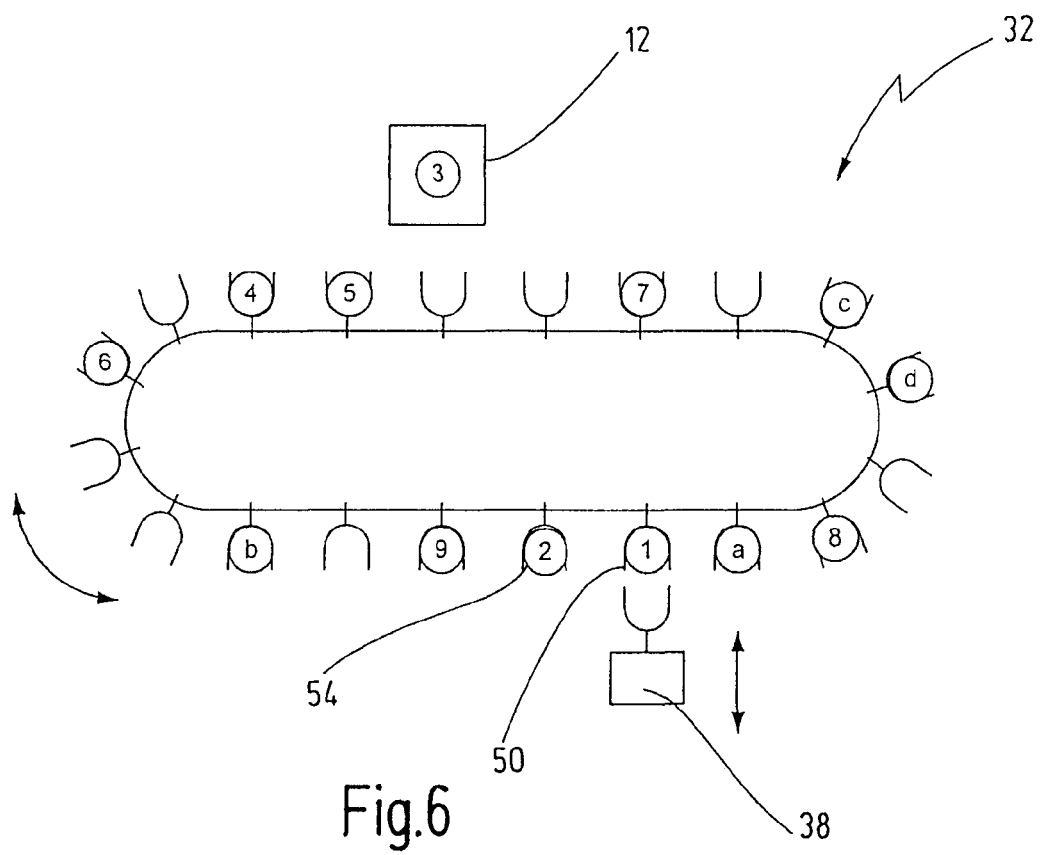
Figure 7:
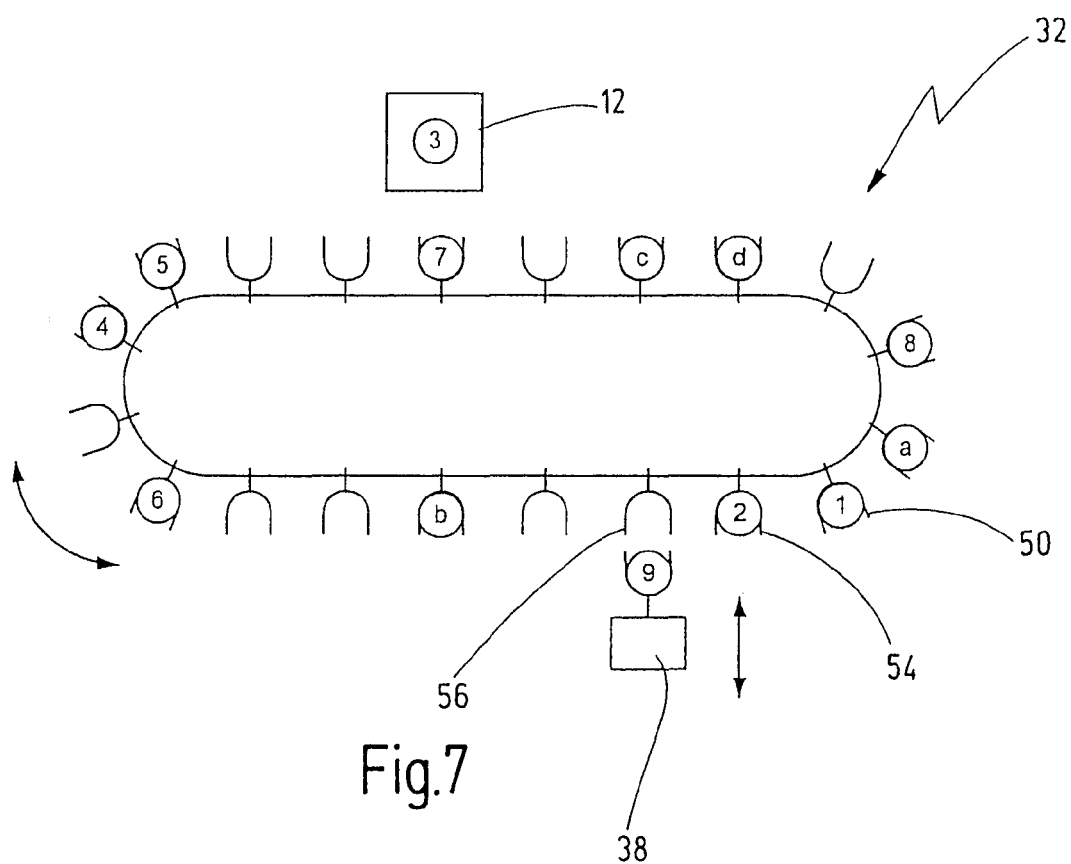

According to FIG. 6, the chain magazine 32 is then moved to such an extent that the spindle 12 can pick up the third cutting tool in the time sequence of the cutting tools. The chain magazine 32 is then moved according to FIG. 7 in such a way that the storage place 56 which is arranged next to the storage place 54 can be cleared by means of the gripper 38.

According to FIG. 8, the chain magazine 32 is then moved again to such an extent that the cleared storage place 56 comes to lie at the transfer position relative to the spindle 12. When the spindle 12 deposits the cutting tool 3 at the storage place 56, the spatial position of the cutting tool 3 in the spatial sequence of the cutting tools 1, 2, 3 corresponds to the time sequence in which the cutting tools are used during the machining of the workpiece 24.

The steps shown with reference to FIGS. 2 to 8 are correspondingly repeated during the machining of the (first) workpiece 24. As can be understood, the tools of the first set are in the process sorted in a spatial sequence 59 which corresponds to the time sequence of the cutting tools. Once all the tools of the first set have been used, the cutting tools 1 to 9 lie in the tool magazine 32 in a sorted arrangement which enables rapid removal of the tools during the subsequent production operations, since the tool magazine 32 needs to be moved only with the step size of the individual storage places. This situation is shown in FIG. 9.

The cutting tools a to d of the second step are sorted in a corresponding manner when a workpiece 30 is machined for the first time in the second working area 28. As shown in FIG. 9, it is preferred if the first cutting tool of the second step, here therefore the cutting tool a, is deposited at a storage place 58 which lies next to the first storage place 50 for the first cutting tool 1 of the first set. Furthermore, it is preferred if the cutting tools a to d of the second set are distributed to the storage places 34 in the opposite direction to the cutting tools 1 to 9 of the first set, as indicated in FIG. 9 by the arrows 60 and 62. For example, the storage places are occupied in an ascending order with tools 1 to 9 of the first set, whereas the storage places are occupied in a descending order with the tools a to d of the second step. In this embodiment, the storage places of the tool magazine 32 can be occupied largely independently of the number of cutting tools in the two tool sets, provided that the number of storage places available in the tool magazine 32 is sufficient overall.

As an alternative to the occupancy of the storage places according to FIG. 9, it is preferred in other embodiments to distribute the cutting tools 1 to 9 of the first set and the cutting tools a to d of the second set to the storage places in a manner nested one inside the other or in an alternate manner. This alternative is advantageous if the workpieces 24, 30 are also machined at least partly in an overlapping manner in the working areas.

In the currently preferred embodiments, the spindle 12 takes the cutting tools from the storage places and also deposits them there again (pick-up method). In a modification thereof, which is schematically indicated in FIG. 9, a cutting tool can be picked up from a storage place using a separate gripper 66, preferably at the same time as the depositing of a cutting tool clamped in place in the spindle 12. The new cutting tool can then be clamped in place by means of the gripper 66, while the spindle 12 returns into its working position.

If a cutting tool, for example the cutting tool 3 from the first set, is required repeatedly in the course of machining the workpiece 24, no re-sorting takes place again in preferred embodiments of the invention in order to reduce the number of re-sorting operations of the tool magazine 32. In other words, the novel apparatus then works as it were with a "virtual fixed place coding" of the cutting tool as soon as the cutting tools have been sorted in the course of the first production operation. In order to minimize the chip-to-chip times even further, a cutting tool that is required repeatedly can be replaced by a plurality of identical cutting tools, which are then deposited in the tool magazine 32 in accordance with the time sequence of the machining steps.

If a cutting tool takes up a plurality of storage places 34 on account of its oversize, a fixed storage place which lies outside the spatial sequence of the cutting tools can be assigned to this oversized cutting tool. As a result, the administration cost and thus the corresponding control program in the controller 44 are simplified. In another embodiment, three storage places 34 lying next to one another are reserved for an oversized cutting tool, the cutting tool being deposited in the middle of the reserved storage places. This embodiment thus sorts the oversized cutting tools in the spatial sequence of the cutting tools and therefore enables the chip-to-chip times to be reduced for this case too.

Sister tools which are provided for replacing a cutting tool in the course of a production process can be deposited at any desired storage place. As soon as the sister tool is used for machining a workpiece for the first time, it is deposited at that storage place which corresponds to its position in the time sequence of the further machining steps. The sister tool is thus automatically sorted in the spatial sequence of the cutting tools.

What is claimed is:

1. A method for machining a workpiece comprising:
providing a machine tool having a tool receptacle for accommodating a cutting tool,
providing a tool magazine having a plurality of storage places which are loaded with a plurality of cutting tools in a first spatial sequence, and
machining the workpiece using cutting tools from the tool magazine in a predefined time sequence,
wherein the predefined time sequence defines a series of previous and subsequent cutting tools, with each previous cutting tool being accommodated in the tool receptacle during a machining operation and being replaced by a subsequent cutting tool from the tool magazine for a subsequent operation in the course of the time sequence,
wherein the first spatial sequence is unsorted as compared to the predefined time sequence, and
wherein the previous cutting tools, when being put back into the tool magazine, are sorted by distributing them to the storage places in a second spatial sequence which is different from the first spatial sequence and substantially corresponds to the time sequence.

2. The method of claim 1, wherein machining the workpiece starts with a first cutting tool, wherein the first cutting tool is deposited at a defined first storage place in the tool magazine after the machining operation, wherein every subsequent cutting tool is deposited at a predefined following storage place, and wherein the predefined following storage spaces are joined to the first storage place.

3. A method for metal cutting machining of a metallic workpiece, comprising:
providing a machine tool having a tool receptacle for accommodating a cutting tool,
providing a tool magazine having a plurality of storage places which are loaded with a plurality of cutting tools in a first spatial sequence, and
machining the workpiece using cutting tools in a predefined time sequence,
with a previous cutting tool accommodated in the tool receptacle during machining in each case being replaced by a subsequent cutting tool from the tool magazine in the course of the time sequence, and the previous cutting tool being deposited at a defined storage place in the tool magazine,
wherein the first spatial sequence is disordered as compared to the predefined time sequence, and
with the previous cutting tools, when being put back into the tool magazine, are ordered by being distributed to the storage places in a second spatial sequence, the second spatial sequence being different from the first spatial sequence and corresponding at least largely to the time sequence.

4. A method for machining a workpiece comprising the steps:
providing a machine tool having a tool receptacle for accommodating a cutting tool,
providing a tool magazine having a plurality of storage places which are loaded with a plurality of cutting tools in a first spatial sequence, and
machining the workpiece using cutting tools from the tool magazine in a predefined time sequence,
wherein the predefined time sequence defines a series of previous and subsequent cutting tools, with each previous cutting tool being accommodated in the tool receptacle during a machining operation and being replaced by a subsequent cutting tool from the tool magazine for a subsequent operation in the course of the time sequence,
wherein the previous cutting tools, when being put back into the tool magazine, are distributed to the storage places in a second spatial sequence which is different from the first spatial sequence and substantially corresponds to the time sequence, and
wherein the storage place for the previous cutting tool, if already occupied by another tool, is cleared using an automated gripper, while the workpiece is being machined with the previous cutting tool, and, if the storage place for the previous cutting tool is not already occupied by another tool, the previous cutting tool is deposited at this storage place.

5. A method for machining a workpiece comprising the steps:
providing a machine tool having a tool receptacle for accommodating a cutting tool,
providing a tool magazine having a plurality of storage places which are loaded with a plurality of cutting tools in a first spatial sequence, and
machining the workpiece using cutting tools from the tool magazine in a predefined time sequence,
wherein the predefined time sequence defines a series of previous and subsequent cutting tools, with each previous cutting tool being accommodated in the tool receptacle during a machining operation and being replaced by a subsequent cutting tool from the tool magazine for a subsequent operation in the course of the time sequence,
wherein the previous cutting tools, when being put back into the tool magazine, are distributed to the storage places in a second spatial sequence which is different from the first spatial sequence and substantially corresponds to the time sequence, and
wherein the tool receptacle deposits each previous cutting tool directly at its storage place.

6. A method for machining a workpiece comprising the steps:
providing a machine tool having a tool receptacle for accommodating a cutting tool,
providing a tool magazine having a plurality of storage places which are loaded with a plurality of cutting tools in a first spatial sequence, and
machining the workpiece using cutting tools from the tool magazine in a predefined time sequence,
wherein the predefined time sequence defines a series of previous and subsequent cutting tools, with each previous cutting tool being accommodated in the tool receptacle during a machining operation and being replaced by a subsequent cutting tool from the tool magazine for a subsequent operation in the course of the time sequence,
wherein the previous cutting tools, when being put back into the tool magazine, are distributed to the storage places in a second spatial sequence which is different from the first spatial sequence and substantially corresponds to the time sequence, and
wherein the tool receptacle picks up the subsequent cutting tool directly from its storage place.

7. A method for machining a workpiece comprising the steps:
providing a machine tool having a tool receptacle for accommodating a cutting tool,
providing a tool magazine having a plurality of storage places which are loaded with a plurality of cutting tools in a first spatial sequence, and
machining the workpiece using cutting tools from the tool magazine in a predefined time sequence,
wherein the predefined time sequence defines a series of previous and subsequent cutting tools, with each previous cutting tool being accommodated in the tool receptacle during a machining operation and being replaced by a subsequent cutting tool from the tool magazine for a subsequent operation in the course of the time sequence,
wherein the previous cutting tools, when being put back into the tool magazine, are distributed to the storage places in a second spatial sequence which is different from the first spatial sequence and substantially corresponds to the time sequence, and
wherein the machine tool has at least two working areas for machining workpieces, with a separate set of cutting tools being provided in the tool magazine for each working area.

8. The method of claim 7, wherein a first set of cutting tools, when being put back into the tool magazine, is distributed to the storage places in the second spatial sequence, and a second set of cutting tools, when being put back into the tool magazine, is distributed to the storage places in a third spatial sequence.

9. The method of claim 8, wherein the second and the third sequence start at adjacent storage places.

10. The method of claim 9, wherein the second and the third sequences occupy the storage places in opposite directions.

11. The method of claim 8, wherein the second and the third sequence are interposed with respect to each other.

12. The method of claim 7, wherein the tool magazine is a chain magazine having a revolving chain, on which the storage places are arranged.

13. The method of claim 7, wherein the workpiece is a metallic workpiece, and wherein the step of machining comprises a metal cutting machining.

14. A method for metal cutting machining of a metallic workpiece, comprising the steps:
providing a machine tool having a tool receptacle for accommodating a cutting tool,
providing a tool magazine having a plurality of storage places which are loaded with a plurality of cutting tools in a first spatial sequence, and
machining the workpiece using cutting tools in a predefined time sequence,
with a previous cutting tool accommodated in the tool receptacle during machining in each case being replaced by a subsequent cutting tool from the tool magazine in the course of the time sequence, and the previous cutting tool being deposited at a defined storage place in the tool magazine, and
with the previous cutting tools, when being put back into the tool magazine, being distributed to the storage places in a second spatial sequence, the second spatial sequence being different from the first spatial sequence and corresponding at least largely to the time sequence, and
wherein the storage place for the previous cutting tool, if already occupied by another tool, is cleared using an automated gripper, while the workpiece is being machined with the previous cutting tool and, if the storage place for the previous cutting tool is not already occupied by another tool, the previous cutting tool is deposited at this storage place.

15. The method of claim 14, wherein machining the workpiece starts with a first cutting tool, wherein the first cutting tool is deposited at a defined first storage place in the tool magazine after the machining operation, wherein every subsequent cutting tool is deposited at a predefined following storage place, and wherein the predefined following storage spaces are joined to the first storage place.

16. A method for metal cutting machining of a metallic workpiece, comprising the steps:
providing a machine tool having a tool receptacle for accommodating a cutting tool,
providing a tool magazine having a plurality of storage places which are loaded with a plurality of cutting tools in a first spatial sequence, and
machining the workpiece using cutting tools in a predefined time sequence, with a previous cutting tool accommodated in the tool receptacle during machining in each case being replaced by a subsequent cutting tool from the tool magazine in the course of the time sequence, and the previous cutting tool being deposited at a defined storage place in the tool magazine, and
with the previous cutting tools, when being put back into the tool magazine, being distributed to the storage places in a second spatial sequence, the second spatial sequence being different from the first spatial sequence and corresponding at least largely to the time sequence, and
wherein the tool receptacle deposits each previous cutting tool directly at its storage place.

17. A method for metal cutting machining of a metallic workpiece, comprising the steps:
providing a machine tool having a tool receptacle for accommodating a cutting tool,
providing a tool magazine having a plurality of storage places which are loaded with a plurality of cutting tools in a first spatial sequence, and
machining the workpiece using cutting tools in a predefined time sequence,
with a previous cutting tool accommodated in the tool receptacle during machining in each case being replaced by a subsequent cutting tool from the tool magazine in the course of the time sequence, and the previous cutting tool being deposited at a defined storage place in the tool magazine, and
with the previous cutting tools, when being put back into the tool magazine, being distributed to the storage places in a second spatial sequence, the second spatial sequence being different from the first spatial sequence and corresponding at least largely to the time sequence, and
wherein the tool receptacle picks up the subsequent cutting tool directly from its storage place.

* * * * *

UNITED STATES PATENT AND TRADEMARK OFFICE
CERTIFICATE OF CORRECTION

PATENT NO.        : 8,202,206 B2
APPLICATION NO.   : 11/820522
DATED             : June 19, 2012
INVENTOR(S)       : Achim Feinauer et al.

It is certified that error appears in the above-identified patent and that said Letters Patent is hereby corrected as shown below:

On the Title Page

In Foreign Patent Documents (Item (56)):

On Page 1, column 2, "DE 1 193 068" should read --GB 1 193 068--

On Page 1, column 2, "DE 1 251 064" should read --GB 1 251 064--

On Page 1, column 2, "DE 1 342 225" should read --GB 1 342 225--

Signed and Sealed this
Twenty-fourth Day of June, 2014

Michelle K. Lee
*Deputy Director of the United States Patent and Trademark Office*